(12) United States Patent
Hayashi

(10) Patent No.: US 9,031,368 B2
(45) Date of Patent: May 12, 2015

(54) MULTI-CORE OPTICAL FIBER, MULTI-CORE OPTICAL FIBER CABLE, AND MULTI-CORE OPTICAL FIBER TRANSMISSION SYSTEM

(71) Applicant: Sumitomo Electric Industries, Ltd., Osaka-shi, Osaka (JP)

(72) Inventor: Tetsuya Hayashi, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 213 days.

(21) Appl. No.: 13/868,274

(22) Filed: Apr. 23, 2013

(65) Prior Publication Data

US 2013/0301998 A1 Nov. 14, 2013

Related U.S. Application Data

(60) Provisional application No. 61/644,035, filed on May 8, 2012.

(30) Foreign Application Priority Data

Apr. 26, 2012 (JP) ................... 2012-101254

(51) Int. Cl.
*G02B 6/44* (2006.01)
*G02B 6/02* (2006.01)
(52) U.S. Cl.
CPC .......... *G02B 6/02042* (2013.01); *G02B 6/4401* (2013.01); *G02B 6/4413* (2013.01)
(58) Field of Classification Search
USPC ........................................................ 385/100
See application file for complete search history.

(56) References Cited

U.S. PATENT DOCUMENTS

2011/0129190 A1* 6/2011 Fini et al. ..................... 385/126

FOREIGN PATENT DOCUMENTS

| JP | H3-080281 | 12/1991 |
| JP | 2981088 | 9/1999 |
| JP | 2011-150133 | 8/2011 |
| JP | 2011-197661 | 10/2011 |
| JP | 2011-237782 | 11/2011 |

(Continued)

OTHER PUBLICATIONS

Yasuo Kokubun, et al., "Proposal of Heterogeneous Uncoupled and Homogeneous Coupled Multicore Fibers for Spec/Mode-Division Multiplexing", IEICE Technical Report, vol. 109, No. 159, Jul. 23, 2009, pp. 165-170.

(Continued)

*Primary Examiner* — Jerry Rahll
*Assistant Examiner* — Hoang Tran
(74) *Attorney, Agent, or Firm* — Drinker Biddle & Reath LLP

(57) ABSTRACT

The present invention relates to a multi-core optical fiber enabling calculation effectively using the MEMO technology. The multi-core optical fiber has a plurality of cores and a cladding and the cores rotate around a fiber axis. A conditional expression defined by an average twist rate $\gamma$ (rad/m), the shortest distance $\Lambda$ (m) between centers of the cores, a group index $n_g$, an in-use bending radius R (m), the speed of light in vacuum c (m/s), and the ratio of the circumference of a circle to its diameter $\pi$ is not more than $7.91 \times 10^{-12}$ $(s/m^{1/2})$ as an example.

18 Claims, 7 Drawing Sheets

(56) References Cited

FOREIGN PATENT DOCUMENTS

| WO | WO 2009/107667 | 9/2009 |
|----|----------------|--------|
| WO | WO 2010-038861 | 4/2010 |
| WO | WO 2011/004836 | 1/2011 |
| WO | WO 2012/029721 | 3/2012 |

OTHER PUBLICATIONS

T. Hayashi, et al., "Crosstalk Variation of Multi-Core Fibre due to Fibre Bend", ECOC2010, We.8.f.6, 2010.

J.M. Fini, et al., "Crosstalk in Multicore Fibers with Randomness: Gradual Drift vs. Short-Length Variations", Optics Express, vol. 20, No. 2, Jan. 16, 2012, pp. 949-959.

R. Ryf, et al., "Space-Division Multiplexed Transmission over 4200-km 3-Core Microstructured Fiber," OFC/NFOEC2012, Mar. 8, 2012.

Joseph M. Kahn, et al., "Mode Coupling Effects in Multi-Mode Fibers," OFC/NFOEC Technical Diges OW3D.3, 23 Ja. 2012.

English-language translation of International Preliminary Report on Patentability (IPRP) dated Nov. 6, 2014 that issued in WO Patent Application No. PCT/JP2013/061940.

* cited by examiner (a)

(b)

MULTI-CORE OPTICAL FIBER, MULTI-CORE OPTICAL FIBER CABLE, AND MULTI-CORE OPTICAL FIBER TRANSMISSION SYSTEM

BACKGROUND OF THE INVENTION

1. Field of the Invention

The present invention relates to a multi-core optical fiber, a multi-core optical fiber cable, and a multi-core optical fiber transmission system.

2. Related Background Art

Core twisting technologies are used to reduce polarization mode dispersion (PMD) in optical fibers configured to transmit light in a confined state inside a core extending along a predetermined axis. For example, Japanese Patent No. 2981088 (Patent Literature 1) shows a configuration wherein during fiber drawing of a single-core optical fiber, glass in a molten state is twisted (or spun) to randomize influence of residual stress due to non-circularity or non-circular symmetry of the core so as to leave no deviation in any specific direction, thereby to reduce the PMD caused by the fiber itself. International Publication WO2009/107667 (Patent Literature 2) shows a configuration wherein after glass solidifies, the single-core optical fiber is twisted to reduce the PMD due to outside factors of the fiber such as fiber bending or lateral pressure.

There are also studies on the core twisting technologies in multi-core optical fibers. For example, T. Hayashi et al., "Crosstalk Variation of Multi-Core Fibre due to Fibre Bend," ECOC2010, We.8.F.6 (Non Patent Literature 1) shows that in an uncoupled multi-core optical fiber in which interference between signals is suppressed by reducing crosstalk between cores, the magnitude (statistical average) of crosstalk is independent of at least the twist of the optical fiber. Furthermore, J. M. Fini et al., "Crosstalk in multicore fibers with randomness: gradual drift vs. short-length variations," Optics Express, vol. 20, no. 2, pp. 949-959 (Non Patent Literature 2) shows the simulation result indicative of a possibility of a significant reduction in inter-core crosstalk in an uncoupled multi-core optical fiber when the twist rate per unit length is precisely controlled and the fiber is twisted at a constant short pitch of about 100 rotations/m.

SUMMARY OF THE INVENTION

The Inventor has conducted investigation on the conventional multi-core optical fibers and found the problem as described below. Specifically, the technologies of spatial multiplexing transmission with compensation for crosstalk between spatial modes by the MIMO (Multiple-Input and Multiple-Output) technology have been used in recent years. However, the spatial multiplexing transmission had the problem that a load of calculation (MIMO calculation) for the crosstalk compensation by the MIMO technology was large because of a large differential group delay between spatial modes (DGD between spatial modes). R. Ryf et al., "Space-Division Multiplexed Transmission over 4200-km 3-Core Microstructured Fiber," OFC/NFoEC2012 paper PDP5C.2, Mar. 8, 2012 (Non Patent Literature 3) describes the technique of transmitting signals by means of a coupled multi-core optical fiber (multi-core optical fiber with high crosstalk between cores) and demultiplexing and decoding signals of respective cores mixed because of crosstalk, by the MIMO technology.

In contrast to it, it is already known that in a coupled multi-core optical fiber as used in spatial multiplexing transmission, DGD between supermodes is reduced by enhancing confinement of light in each core or by increasing the core pitch, while studies on the DGD between spatial modes of individual cores (inter-core DGD) are not always sufficient, and influence of core twisting (spin or twist) on the inter-core DGD does not have been studied well heretofore, either; it was thus difficult to select a preferred multi-core optical fiber for use of the MIMO technology.

The present invention has been accomplished in order to solve the above-described problem and it is an object of the present invention to provide a multi-core optical fiber, a multi-core optical fiber cable, and a multi-core optical fiber transmission system enabling calculation effectively using the MIMO technology.

A multi-core optical fiber according to an embodiment of the present invention as a first aspect comprises: a plurality of cores each extending along a predetermined axis (an axis extending along the longitudinal direction of the multi-core optical fiber) and arranged on a cross section perpendicular to the predetermined axis; and a cladding region integrally surrounding each of the cores, and the plurality of cores rotate in a helical shape around the predetermined axis. This multi-core optical fiber according to the first aspect satisfies at least any one condition of below-defined first to third conditions and satisfies at least either one condition of below-defined fourth and fifth conditions when an average twist rate defined as an average value along the longitudinal direction of the multi-core optical fiber of absolute values of angles of rotations of the cores per unit length, of the multi-core optical fiber is γ (rad/m), when the shortest distance between centers of the respective cores is Λ (m), when a group index for a fundamental mode in each of the cores is $n_g$, when an in-use bending radius defined as a bending radius in use of the multi-core optical fiber is R (m), when the speed of light in vacuum is c (m/s), and when the ratio of the circumference of a circle to its diameter is π.

The first condition is defined so that Expression (1) below is not more than $7.91 \times 10^{-12}$ (s/m$^{1/2}$). The second condition is defined so that in a state in which the multi-core optical fiber is wound on a bobbin with a radius $R_{bobbin}$ (m), Expression (2) below is not more than $7.91 \times 10^{-12} \times 1/R_{bobbin}$ (s/m$^{1/2}$). The third condition is defined so that the shortest distance Λ is not more than approximately $25 \times 10^{-6}$ m and the average twist rate γ is not less than approximately 4.72 rad/m. The fourth condition is defined so that the shortest distance Λ is not more than approximately $25 \times 10^{-6}$ m. The fifth condition is defined so that a crosstalk between closest adjacent cores is not less than −15 dB.

$$\frac{2n_g \Lambda}{cR\sqrt{\gamma\pi}} \quad (1)$$

$$\frac{2n_g \Lambda}{cR_{bobbin}\sqrt{\gamma\pi}} \quad (2)$$

A second aspect applicable to the first aspect is preferably the multi-core optical fiber wherein in the state in which the multi-core optical fiber is wound on the bobbin with the radius $R_{bobbin}$ (m), the aforementioned Expression (2) is not more than $7.91 \times 10^{-12} \times 0.2/R_{bobbin}$ (s/m$^{1/2}$). A third aspect applicable to at least either one of the first and second aspects is preferably the multi-core optical fiber wherein the first condition is defined so that the aforementioned Expression (1) is not more than $1.58 \times 10^{-13}$ (s/m$^{1/2}$), and wherein the second condition is defined so that in the state in which the multi-core optical fiber is wound on the bobbin with the radius $R_{bobbin}$ (m), the aforementioned Expression (2) is not more than $1.58 \times 10^{-13} \times 1/R_{bobbin}$ (s/m$^{1/2}$), and the multi-core optical fiber satisfies at least either one condition of the foregoing first and second conditions. A fourth aspect applicable to at least any one of the first to third aspects is preferably the multi-core optical fiber wherein in the state in which the multi-core optical fiber is wound on the bobbin with the radius $R_{bobbin}$ (m), the aforementioned Expression (2) is not more than $1.58 \times 10^{-13} \times 0.2/R_{bobbin}$ (s/m$^{1/2}$). A fifth aspect applicable to at least any one of the first to fourth aspects is preferably the multi-core optical fiber wherein the in-use bending radius R is not less than 1 m. A sixth aspect applicable to at least any one of the first to fifth aspects is preferably the multi-core optical fiber wherein the in-use bending radius R is not less than 0.2 m.

Furthermore, a seventh aspect applicable to at least any one of the first to sixth aspects is the multi-core optical fiber which may comprise at least one core group composed of a plurality of cores arranged at equal intervals on the circumference of an identical circle in the cross section out of the plurality of cores. In this case, preferably, the cores belonging to the core group each have the same structure and a crosstalk between adjacent cores out of the cores belonging to the core group is not less than −15 dB. Furthermore, the multi-core optical fiber may comprise a plurality of core groups composed of the plurality of cores, and in this configuration wherein the core groups are arranged, the core groups are adequately separated from each other so that a crosstalk between the core groups is not more than −15 dB. An eighth aspect applicable to at least any one of the first to seventh aspects is preferably the multi-core optical fiber wherein when the plurality of cores constitute a plurality of core groups, the cores belonging to all the core groups are arranged on the circumference of any one of a plurality of concentric circles.

A multi-core optical fiber cable according to an embodiment of the present invention as a ninth aspect has an embedded multi-core optical fiber comprising: a plurality of cores each extending along a predetermined axis and arranged on a cross section perpendicular to the predetermined axis; and a cladding region integrally surrounding each of the cores, and the plurality of cores rotate around the predetermined axis. In this multi-core optical fiber cable according to the ninth aspect, the multi-core optical fiber is embedded while maintaining a state in which Expression (3) below is not more than $7.91 \times 10^{-12}$ (s/m$^{1/2}$) when an average twist rate defined as an average value along the longitudinal direction of the multi-core optical fiber of absolute values of angles of rotations of the cores per unit length, of the multi-core optical fiber is γ (rad/m), when the shortest distance between centers of the respective cores is Λ (m), when a group index for a fundamental mode in each of the cores is $n_g$, when an in-use bending radius defined as a bending radius in use of the multi-core optical fiber is R (m), when the speed of light in vacuum is c (m/s), and when the ratio of the circumference of a circle to its diameter is π.

$$\frac{2n_g \Lambda}{cR\sqrt{\gamma \pi}} \quad (3)$$

A tenth aspect applicable to the ninth aspect is the multi-core optical fiber cable wherein the multi-core optical fiber is embedded while maintaining a state in which the aforementioned Expression (3) is not more than $1.58 \times 10^{-13}$ (s/m$^{1/2}$). An eleventh aspect applicable to at least either one of the ninth and tenth aspects is preferably the multi-core optical fiber cable wherein the multi-core optical fiber is embedded so that an average of bending radii along the longitudinal direction thereof is not less than 0.2 m. An twelfth aspect applicable to at least any one of the ninth to eleventh aspects is preferably the multi-core optical fiber cable wherein the shortest distance Λ is not more than $25 \times 10^{-6}$ m. A thirteenth aspect applicable to at least any one of the ninth to twelfth aspects is preferably the multi-core optical fiber cable wherein a crosstalk between closest adjacent cores out of the plurality of cores is not less than −15 dB.

A multi-core optical fiber transmission system according to an embodiment of the present invention as a fourteenth aspect uses as a transmission line a multi-core optical fiber comprising: a plurality of cores each extending along a predetermined axis and arranged on a cross section perpendicular to the predetermined axis; and a cladding region integrally surrounding each of the cores. In this multi-core optical fiber transmission system according to the fourteenth aspect, the number of taps $N_{tap}$ in execution of a spatially demultiplexing calculation by the MIMO technology is set to satisfy a relation defined by Expression (4) below when an average twist rate defined as an average value along the longitudinal direction of the multi-core optical fiber of absolute values of angles of rotations of the cores per unit length, of the multi-core optical fiber is γ (rad/m), when the shortest distance between centers of the respective cores is Λ (m), when a group index for a fundamental mode in each of the cores is $n_g$, when a longitudinal average defined as an average of bending radii along the longitudinal direction, of the multi-core optical fiber is R (m), when the speed of light in vacuum is c (m/s), when the ratio of the circumference of a circle to its diameter is π, and when a symbol rate of signal modulation is $f_{symbol}$ (Baud).

$$\frac{N_{tap}}{12 f_{symbol}} \leq 2\frac{n_g \Lambda}{cR}\sqrt{\frac{L}{\gamma \pi}} \leq \frac{N_{tap}}{8 f_{symbol}} \quad (4)$$

A fifteenth aspect applicable to the fourteen aspect is preferably the multi-core optical fiber transmission system wherein the shortest distance Λ is not more than $25 \times 10^{-6}$ m.

A multi-core optical fiber transmission system according to an embodiment of the present invention as a sixteenth aspect may use the multi-core optical fiber according to at least any one of the first to eighth aspects as a transmission line. In this case, the multi-core optical fiber transmission system according to the sixteenth aspect is preferably one wherein when a fiber link length between a transmitter and a receiver is L (m) and when a symbol rate of signal modulation is $f_{symbol}$ (Baud), the number of taps $N_{tap}$ in execution of a spatially demultiplexing calculation by the MIMO technology is set to satisfy a relation defined by Expression (5) below.

$$8 \times 1.58 \times 10^{-13} \sqrt{L} \leq \frac{N_{tap}}{f_{symbol}} \leq 12 \times 1.58 \times 10^{-13} \sqrt{L} \quad (5)$$

Furthermore, a multi-core optical fiber transmission system according to an embodiment of the present invention as a seventeenth aspect may use the multi-core optical fiber cable according to at least any one of the ninth to thirteenth aspects as a transmission line. In this case, the multi-core optical fiber transmission system according to the seventeenth aspect is preferably one wherein when a fiber link length between a transmitter and a receiver is L (m) and when a symbol rate of signal modulation is $f_{symbol}$ (Baud), the number of taps $N_{tap}$ in execution of a spatially demultiplexing calculation by the MIMO technology is set to satisfy a relation defined by Expression (6) below.

$$8 \times 1.58 \times 10^{-13} \sqrt{L} \leq \frac{N_{tap}}{f_{symbol}} \leq 12 \times 1.58 \times 10^{-13} \sqrt{L} \qquad (6)$$

Furthermore, an eighteenth aspect applicable to at least any one of the fourteenth to seventeenth aspects is preferably the multi-core optical fiber transmission system wherein a crosstalk between closest adjacent cores out of the plurality of cores is not less than −15 dB.

DETAILED DESCRIPTION OF THE PREFERRED EMBODIMENTS

Figure 1:
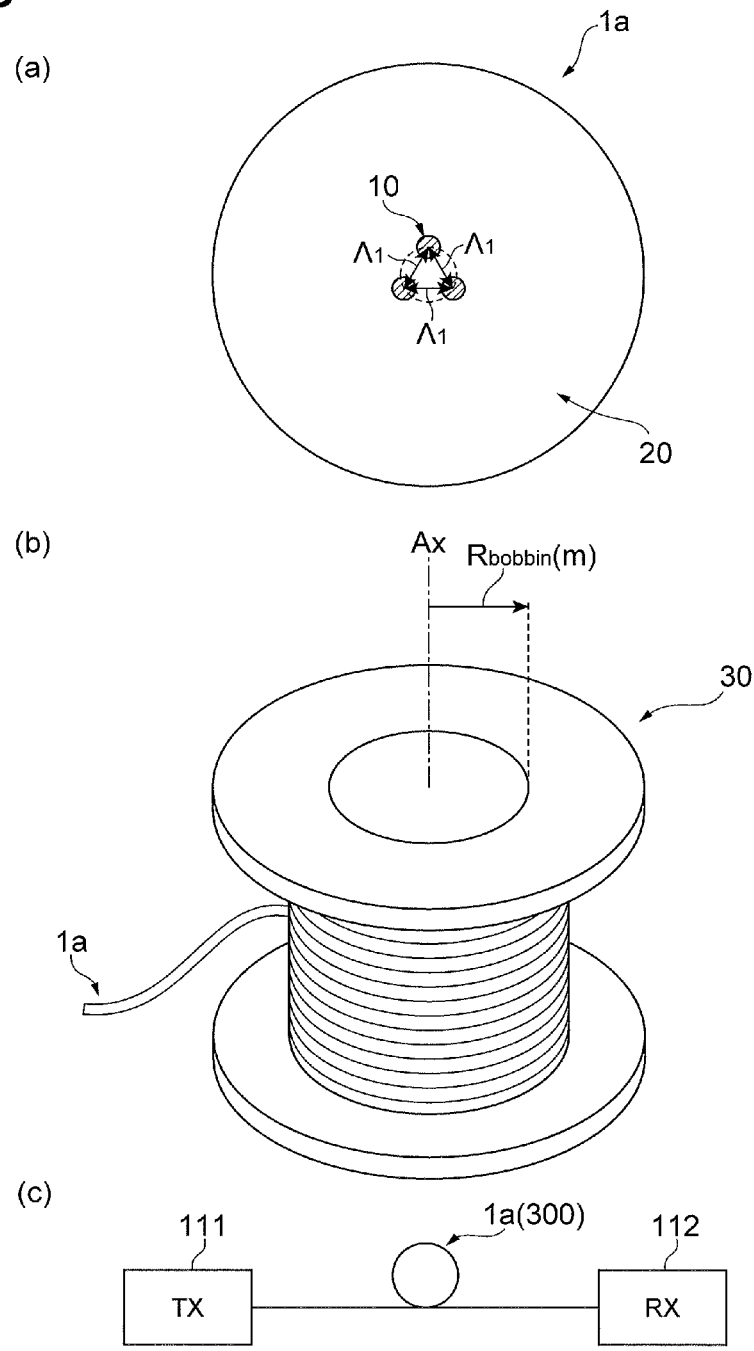
FIGS. 1A to 1C are a sectional view illustrating a first example of core arrangement in a multi-core optical fiber according to an embodiment of the present invention, a perspective view illustrating a state in which the multi-core optical fiber is wound on a bobbin, and a view illustrating a multi-core optical fiber transmission system.
Figure 2:
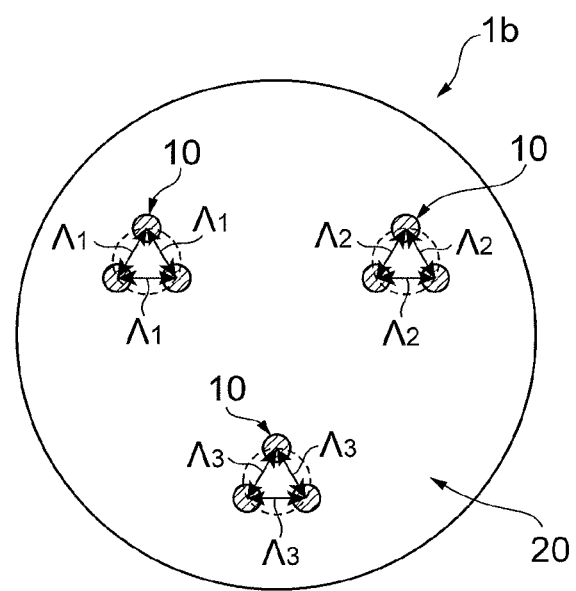
FIG. 2 is a sectional view illustrating a second example of core arrangement in a multi-core optical fiber according to an embodiment of the present invention.
Figure 3:
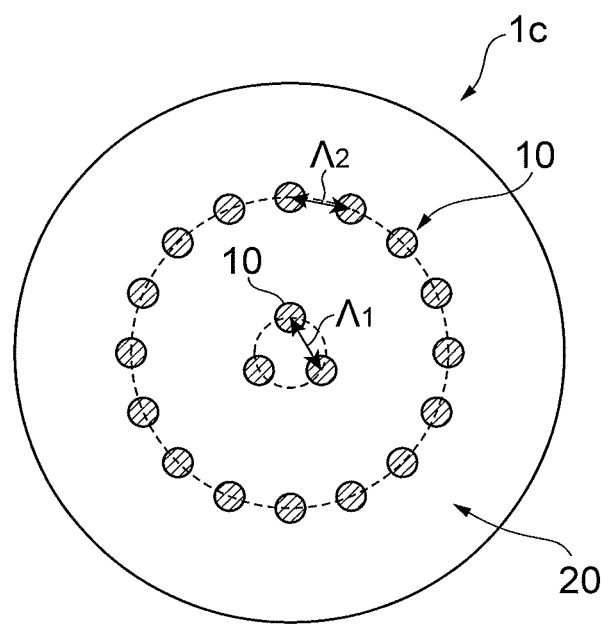
FIG. 3 is a sectional view illustrating a third example of core arrangement in a multi-core optical fiber according to an embodiment of the present invention.

Embodiments of the present invention will be described below in detail with reference to the accompanying drawings. The same elements will be denoted by the same reference signs in the description of the drawings, without redundant description.

The below will first describe influence of magnitude of inter-core DGD in the MIMO (Multiple-Input and Multiple-Output) technology, and then describe the multi-core optical fibers and others according to embodiments of the present invention.

In the MIMO technology, there are known techniques of compensating the crosstalk between spatial modes and implementing spatial multiplexing (core multiplex/mode multiplex) transmission, but real-time processing is not realized yet because of large computational complexity. Specifically, as the differential group delay between spatial modes (inter-mode DGD) becomes larger, the computational complexity in execution of MIMO computation also needs to increase in proportion to the magnitude of inter-mode DGD. For example, in the absence of the DGD, a calculation to demultiplex mixed signals of M channels $(x_1, \ldots, x_M)$ into original signals $(y_1, \ldots, y_M)$ by the MIMO technology can be simplified as represented by Expression (7) below.

$$\begin{pmatrix} y_1 \\ \vdots \\ y_M \end{pmatrix} = \begin{pmatrix} b_{11} & \cdots & b_{1M} \\ \vdots & \ddots & \vdots \\ b_{M1} & \cdots & b_{MM} \end{pmatrix} \begin{pmatrix} x_1 \\ \vdots \\ x_M \end{pmatrix} \qquad (7)$$

In the matrix calculation represented by Expression (7), the computational complexity is proportional to the square of M. The number of channels M in the optical fiber is the product of the number of spatial modes and the number of polarization modes. For example, in the case of a multi-core optical fiber (MCF) in which each core operates in a single mode, the number of channels M is twice the number of cores. On the other hand, in the presence of the DGD, a calculation using a finite impulse response (FIR) filter is needed and a calculation to demultiplex mixed signals x into original signals y by the MIMO technology can be represented by Expression (8) below, using y[n] and x[n] as respective signal strings.

$$\begin{pmatrix} y_1[n] \\ \vdots \\ y_M[n] \end{pmatrix} = \sum_{l=0}^{N} \begin{pmatrix} b_{11}[l] & \cdots & b_{1M}[l] \\ \vdots & \ddots & \vdots \\ b_{M1}[l] & \cdots & b_{MM}[l] \end{pmatrix} \begin{pmatrix} x_1[n-l] \\ \vdots \\ x_M[n-l] \end{pmatrix} \qquad (8)$$

In this case, since the signals necessary for demultiplexing into y[n] are distributed over the range from x[n−N] to x[n] because of the DGD, the computational complexity becomes (N+1) times that in the case of Expression (7).

Here, (N+1) is generally called the number of taps $N_{tap}$ and the smaller the number of taps, the smaller the computational complexity. If the DGD is small, spread of received signals on the time axis will become small, so as to decrease the number of taps. When a symbol rate (the number of modulation symbols per unit time) is small, the number of signal samplings per unit time is small even with constant spread of received signals on the time axis and thus the number of taps can be decreased. However, the symbol rate is preferably set as large as possible, in order to increase the speed of transmitted signals.

The DGD between spatial modes is thus desirably as small as possible, in execution of the calculation using the MIMO technology and there are some techniques for reduction of DGD, reported as to the optical fibers of several modes. On the other hand, it is known that the DGD between supermodes in a coupled multi-core optical fiber can be reduced by enhancing confinement of light in each core or by increasing the core pitch. However, the DGD between spatial modes of individual cores (inter-core DGD) does not have been so much investigated heretofore and it was not clear yet how the spin or twist of optical fiber affected the inter-core DGD, either.

The below will describe the result of investigation on the foregoing matter. It is noted that when the description below concerns discussions using a value of inter-core crosstalk, the value refers to an "average of statistical distribution of crosstalk." For example, in the case of an average XT of statistical distribution of crosstalk between core m and core n, a value defined as $XT = P_{nm}/P_{mm}$ is used. In this relation, $P_{nm}$ means a statistical average of output light power from core n when light is injected into core m.

First, let us consider a distribution of inter-core DGD of a coupled MCF in the case of a 2-core fiber for simplicity.

For a start, according to Non Patent Literature 1, bending of a fiber leads to very small differences between bending radii of respective cores depending on positions of the cores in the fiber and, therefore, it also leads to differences of optical paths of the respective cores. For handling them as straight waveguides, it is necessary to use an equivalent refractive index. The equivalent refractive index is obtained by multiplying an actual refractive index by $(1+x/R)$. The parameter R herein is a bending radius of a core as a reference, and x an amount of deviation from the reference core in the direction of bending radius. Therefore, each core in the MCF can have different equivalent refractive indices depending on bending and twisting of the MCF.

Since it is found according to Non Patent Literature 2 that the crosstalk between core m and core n in the MCF, or exchange of power mostly occurs at phase matching points where the equivalent refractive indices of core m and core n are equal, the crosstalk in the MCF can be modeled as exchange of power between cores discretely occurring at the phase matching points only.

At this time, assuming for simplicity that the phase matching points exist at equal intervals in the MCF and that at each phase matching point half of power in core m is transferred to core n and half of power in core n is transferred to core m, let us consider how the DGD varies against fiber length.

When the group indices of core m and core n are represented by $n_{g,m}$ and $n_{g,n}$, respectively, and a reference is defined at a midpoint between core m and core n, an equivalent group index of core m with consideration of the bending and twisting can be expressed by Expression (9) below and that of core n by Expression (10) below. In these formulas, $\Lambda$ stands for a distance (core pitch) between the center of core m and the center of core n, and $\theta$ for an angle (rad) relative to the bending radius direction of position on a cross section of the MCF, of "core m" as viewed from the "midpoint between core m and core n."

$$n_{g,eq,m} = n_{g,m}\left(1 + \frac{\Lambda}{2R(z)}\cos\theta(z)\right) \quad (9)$$

$$n_{g,eq,n} = n_{g,n}\left(1 - \frac{\Lambda}{2R(z)}\cos\theta(z)\right) \quad (10)$$

For simplicity, let us consider herein a case where the MCF is twisted at a constant twist rate $\gamma$ (rad/unit length). Then $\theta$ can be expressed by Expression (11) below.

$$\theta(z) = \gamma z \quad (11)$$

With the foregoing Expressions (9) to (11) in mind, one interval (in length $\pi/\gamma$) between certain two adjacent phase matching points is considered to fall within the range of Expression (12) below.

$$\frac{\pi}{2\gamma} \leq z \leq \frac{3\pi}{2\gamma} \quad (12)$$

At this time, assuming for simplicity that R is constant, an average equivalent group index perceived in one interval of Expression (12) by light having passed through core m is a value resulting from addition of a value of Expression (13) below to the actual group index $n_{g,m}$.

$$\delta n_{g,eq,m} = \frac{1}{\pi/\gamma}\int_{\frac{\pi}{2\gamma}}^{\frac{3\pi}{2\gamma}}\left[n_{g,m}\left(1 + \frac{\Lambda}{2R}\cos\gamma z\right) - n_{g,m}\right]dz \quad (13)$$

$$= -\frac{n_{g,m}\Lambda}{\pi R}$$

Similarly, an average equivalent group index perceived by light having passed through core n is a value resulting from addition of a value of Expression (14) below to the actual group index $n_{g,n}$.

$$\delta n_{g,eq,n} = \frac{1}{\pi/\gamma}\int_{\frac{\pi}{2\gamma}}^{\frac{3\pi}{2\gamma}}\left[n_{g,n}\left(1 - \frac{\Lambda}{2R}\cos\gamma z\right) - n_{g,n}\right]dz \quad (14)$$

$$= \frac{n_{g,n}\Lambda}{\pi R}$$

In an interval adjacent to the interval of Expression (12), the average equivalent group indices perceived by the light beams having passed through the respective cores are given by values resulting from addition of values with inverted signs from Expressions (13) and (14) to the respective actual group indices.

Since the length of one interval between two adjacent phase matching points can be expressed by Expression (15) below, the group delays of the light having passed through core m and the light having passed through core n show variations represented by Expressions (16a) and (16b) below, per interval between two adjacent phase matching points (double-signs correspond). In the formulas, c represents the speed of light in vacuum.

$$L_c = \frac{\pi}{\gamma} \quad (15)$$

$$\tau_m = \frac{L_c}{c/(n_{g,m} + \delta n_{g,eq,m})} \quad (16a)$$

$$= n_{g,m} + \left(1 \mp \frac{\Lambda}{c\gamma R}\right)$$

$$\tau_n = \frac{L_c}{c/(n_{g,n} + \delta n_{g,eq,n})} \quad (16b)$$

$$= n_{g,n} + \left(1 \pm \frac{\Lambda}{c\gamma R}\right)$$

Therefore, the differential group delay between core m and core n is given by a value expressed by Expression (17) below.

$$\delta\tau = |\tau_m - \tau_n| \quad (17)$$

$$= \left|(n_{g,m} - n_{g,n}) \mp (n_{g,m} + n_{g,n})\frac{\Lambda}{c\gamma R}\right|$$

For decreasing the differential group delay between the cores represented by Expression (17) above, it is first preferable that $n_{g,m} = n_{g,n}$. For satisfying the condition of $n_{g,m} = n_{g,n}$, core m and core n preferably have the same structure.

For more detailed consideration, the group index $n_g$ of a certain mode in a certain core is expressed by Expression (18) below where $\beta$ is the propagation constant of the certain mode and $\omega$ the angular frequency of light, and the propagation constant $\beta$ of the certain mode is affected by surrounding cores.

$$n_g = c\frac{d\beta}{d\omega} \tag{18}$$

For a plurality of cores coupled with so high crosstalk as to require the crosstalk compensation by the MIMO calculation, to have the equal propagation constant of modes of the respective cores and the equal group index, it is desirable that the plurality of cores coupled with high crosstalk have the same structure and that constellations of other cores with respect to the respective cores be congruent. For more specific description, FIGS. 1A to 1C and FIGS. 2 and 3 show sectional structures and others of multi-core optical fibers 1a to 1c in which a plurality of cores 10 are arranged in a cladding 20. Namely, a preferred core constellation with high crosstalk (e.g., −15 dB or more) between adjacent cores is such that cores 10 are arranged at equal intervals (of core pitch $\Lambda_1$) on an identical circle like the multi-core optical fiber 1a shown in FIG. 1A. FIG. 1B shows a state of the multi-core optical fiber 1a wound on a bobbin 30 (having a cylinder with the radius $R_{bobbin}$ (m) along its central axis AX) with turns of the multi-core optical fiber 1a thereon. FIG. 1C shows a multi-core optical fiber transmission system using the multi-core optical fiber 1a as a transmission line. A transmitter 111 is optically connected to one end of this multi-core optical fiber 1a and a receiver 112 to the other end. The various multi-core optical fibers described below may be wound on the bobbin 30. Another preferred core constellation is as follows like the multi-core optical fiber 1b shown in FIG. 2: there are a plurality of core groups in each of which a plurality of cores 10 are arranged at equal intervals on an identical circle (the example of FIG. 2 includes three core groups of cores 10 arranged at respective core pitches $\Lambda_1$, $\Lambda_2$, and $\Lambda_3$); the cores 10 in each core group have the same structure in the core group; the crosstalk between adjacent cores in each core group is not less than −15 dB. In this constellation, the core groups are preferably adequately separated from each other, so as to make the crosstalk between the core groups not more than −15 dB. When the fiber has a plurality of core groups, a more preferred constellation is such that "the cores belonging to all the core groups are arranged on a plurality of concentric circles," like the multi-core optical fiber 1c shown in FIG. 3, in order to equalize influence from cores in the other core groups on the propagation constant of cores in a certain core group. Specifically, in the example of FIG. 3, the cores 10 are arranged at the core pitch $\Lambda_1$ on the circumference of an inside circle and the cores 10 are arranged at the core pitch $\Lambda_2$ on the circumference of an outside circle. The core pitches $\Lambda_1$ to $\Lambda_3$ are defined by the shortest distances between the centers of adjacent cores. These multi-core optical fibers 1b, 1c are also applicable to the transmission line of the multi-core optical fiber transmission system shown in FIG. 1C.

On the assumption of $n_g = n_{g,m} = n_{g,n}$, the variance of the differential group delay in one interval between two adjacent phase matching points is a value represented by Expression (19) below, and the number of phase matching points N in the MCF with the fiber length L can be calculated according to Expression (20) below.

$$\sigma_{\tau c}^2 = \left(2\frac{n_g \Lambda}{c\gamma R}\right)^2 \tag{19}$$

$$N = \frac{L}{L_c} \tag{20}$$

In view of the foregoing group delays between phase matching points and the crosstalk at phase matching points (transfer of power between core n and core m), where the number N is sufficiently large, an impulse response of each core in the MCF has a normal distribution by the central limit theorem and the variance $\sigma_\tau^2$ of the normal distribution is considered to be $\sigma_{\tau c}^2 N$. The standard deviation of the normal distribution, by rearrangement using Expressions (15), (19), and (20), is as represented by Expression (21) below.

$$\sigma_\tau = \sqrt{\sigma_{\tau c}^2 N} \tag{21}$$
$$= 2\frac{n_g \Lambda}{cR}\sqrt{\frac{L}{\gamma\pi}}$$

The above discussion was based on the condition that γ was constant, but γ can also be assumed to be an average in the fiber longitudinal direction of absolute values of numbers of rotations per fiber length. Since $\sigma_\tau$ can be considered to be a root-mean-square of inter-core DGD herein, it is understood that, in order to decrease the inter-core DGD, it is preferable that the core pitch $\Lambda$ be as small as possible, the bending radius R of the fiber be as large as possible, and the twist rate γ of the fiber be as large as possible.

In the case of transmission using the MCF according to an embodiment of the present invention, since the inter-core crosstalk can be compensated by the MIMO technology and the core pitch $\Lambda$ does not have to increase for reduction of crosstalk, for example, $\Lambda$ is preferably the short core pitch of not more than 25 μm, $\Lambda$ is more preferably the short core pitch of not more than 20 μm, $\Lambda$ is still more preferably the short core pitch of not more than 15 μm, and $\Lambda$ is yet more preferably the short core pitch of not more than 10 μm.

For example, in order to reflect the power of 95.44% or more of the original signals on the MIMO calculation, the number of taps needs to be set so as to cover the time of not less than $4\sigma_\tau$ on the time axis.

Furthermore, in order to reflect the power of 99.74% or more of the original signals on the MIMO calculation, the number of taps needs to be set so as to cover the time of not less than $6\sigma_\tau$ on the time axis.

When a sampling rate of signal (the number of samplings per unit time) is denoted by $f_{sample}$, the number of taps needs to be set to not less than $4\sigma_\tau f_{sample}$, in order to reflect the power of 95.44% or more of the original signals on the MIMO calculation; the number of taps needs to be set to not less than $6\sigma_\tau f_{sample}$ on the time axis, in order to reflect the power of 99.74% or more of the original signals on the MIMO calculation.

Since $f_{sample}$ needs to be set to a frequency of not less than twice a symbol rate $f_{symbol}$, the number of taps needs to be set to not less than $8\sigma_\tau f_{symbol}$, in order to reflect the power of 95.44% or more of the original signals on the MIMO calculation; the number of taps needs to be set to not less than $12\sigma_\tau f_{symbol}$ on the time axis, in order to reflect the power of 99.74% or more of the original signals on the MIMO calculation.

It means that with a desired symbol rate $f_{symbol}$ and the number of taps $N_{tap}$ given, it is necessary to satisfy Expression (22) below, in order to reflect the power of 95.44% or more of the original signals on the MIMO calculation. It also means that it is necessary to satisfy Expression (23) below, in order to reflect the power of 99.74% or more of the original signals on the MIMO calculation.

$$\sigma_T \leq \frac{N_{tap}}{8 f_{symbol}} \quad (22)$$

$$\sigma_T \leq \frac{N_{tap}}{12 f_{symbol}} \quad (23)$$

By rearranging Expressions (21) to (23) above, the MCF preferably satisfies Expression (24) below, in order to reflect the power of 95.44% or more of the original signals on the MIMO calculation, and the MCF more preferably satisfies Expression (25) below, in order to reflect the power of 99.74% or more of the original signals on the MIMO calculation.

$$2 \frac{n_g \Lambda}{cR} \sqrt{\frac{L}{\gamma \pi}} \leq \frac{N_{tap}}{8 f_{symbol}} \quad (24)$$

$$2 \frac{n_g \Lambda}{cR} \sqrt{\frac{L}{\gamma \pi}} \leq \frac{N_{tap}}{12 f_{symbol}} \quad (25)$$

Table 1 below shows the results of calculations of $2n_g\Lambda/(cR)\cdot(L/\gamma\pi)^{1/2}$ desired to be satisfied by the fiber, using Expression (24) and Expression (25), for the number of taps to be 500 or less, 450 or less, 400 or less, 350 or less, 300 or less, 250 or less, 200 or less, 150 or less, 100 or less, and 50 or less, under the condition that $f_{symbol}$ is, for example, not less than 25 GBaud ($=2.5\times10^{10}$ Baud:$2.5\times10^{10}$ symbols per second).

TABLE 1

| $N_{tap}$ | To reflect power of 95.44% or more of original signals on MIMO calculation | To reflect power of 99.74% or more of original signals on MIMO calculation |
|---|---|---|
| 500 or less | $2.5 \times 10^{-9}$ or less | $1.67 \times 10^{-9}$ or less |
| 450 or less | $2.25 \times 10^{-9}$ or less | $1.5 \times 10^{-9}$ or less |
| 400 or less | $2.0 \times 10^{-9}$ or less | $1.33 \times 10^{-9}$ or less |
| 350 or less | $1.75 \times 10^{-9}$ or less | $1.17 \times 10^{-9}$ or less |
| 300 or less | $1.5 \times 10^{-9}$ or less | $1.0 \times 10^{-9}$ or less |
| 250 or less | $1.25 \times 10^{-9}$ or less | $8.33 \times 10^{-10}$ or less |
| 200 or less | $1.0 \times 10^{-9}$ or less | $6.67 \times 10^{-10}$ or less |
| 150 or less | $7.5 \times 10^{-10}$ or less | $5.0 \times 10^{-10}$ or less |
| 100 or less | $5.0 \times 10^{-10}$ or less | $3.33 \times 10^{-10}$ or less |
| 50 or less | $2.5 \times 10^{-10}$ or less | $1.67 \times 10^{-10}$ or less |

When a desired transmission distance is given by L, the MCF preferably satisfies Expression (26) below, in order to reflect the power of 95.44% or more of the original signals on the MIMO calculation, and the MCF more preferably satisfies Expression (27) below, in order to reflect the power of 99.74% or more of the original signals on the MIMO calculation.

$$\frac{2 n_g \Lambda}{cR\sqrt{\gamma\pi}} \leq \frac{N_{tap}}{8 f_{symbol} \sqrt{L}} \quad (26)$$

$$\frac{2 n_g \Lambda}{cR\sqrt{\gamma\pi}} \leq \frac{N_{tap}}{12 f_{symbol} \sqrt{L}} \quad (27)$$

Table 2 shows the results of calculations of $2n_g\Lambda/(cR)\cdot(\gamma\pi)^{-1/2}$ desired to be satisfied by the fiber, using Expression (26) and Expression (27), for the number of taps to be 500 or less, 450 or less, 400 or less, 350 or less, 300 or less, 250 or less, 200 or less, 150 or less, 100 or less, and 50 or less, for example, under the condition that $f_{symbol}$ is not less than 25 GBaud ($=2.5\times10^{10}$ Baud:$2.5\times10^{10}$ symbols per second) and the signals are transmitted at least through the distance L=100 km=$1\times10^5$ m. Table 3 shows the results of calculations of $2n_g\Lambda/(cR)\cdot(\gamma\pi)^{-1/2}$ desired to be satisfied by the fiber, using Expression (26) and Expression (27), for the number of taps to be 500 or less, 450 or less, 400 or less, 350 or less, 300 or less, 250 or less, 200 or less, 150 or less, 100 or less, and 50 or less, under the condition that $f_{symbol}$ is not less than 25 GBaud ($=2.5\times10^{10}$ Baud:$2.5\times10^{10}$ symbols per second) and the signals are transmitted at least through the distance L=1000 km=$1\times10^6$ m. Table 3 shows the results of calculations using Expressions (19) and (20). Namely, the MCF is preferably embedded in a cable so as to have appropriate values of $\Lambda$ and $\gamma$ and maintain appropriate R, so that $2n_g\Lambda/(cR)\cdot(\gamma\pi)^{-1/2}$ satisfies the values in Table 2 or Table 3.

TABLE 2

| $N_{tap}$ | To reflect power of 95.44% or more of original signals on MIMO calculation | To reflect power of 99.74% or more of original signals on MIMO calculation |
|---|---|---|
| 500 or less | $7.91 \times 10^{-12}$ or less | $5.27 \times 10^{-12}$ or less |
| 450 or less | $7.12 \times 10^{-12}$ or less | $4.74 \times 10^{-12}$ or less |
| 400 or less | $6.32 \times 10^{-12}$ or less | $4.22 \times 10^{-12}$ or less |
| 350 or less | $5.53 \times 10^{-12}$ or less | $3.69 \times 10^{-12}$ or less |
| 300 or less | $4.74 \times 10^{-12}$ or less | $3.16 \times 10^{-12}$ or less |
| 250 or less | $3.95 \times 10^{-12}$ or less | $2.64 \times 10^{-12}$ or less |
| 200 or less | $3.16 \times 10^{-12}$ or less | $2.11 \times 10^{-12}$ or less |
| 150 or less | $2.37 \times 10^{-12}$ or less | $1.58 \times 10^{-12}$ or less |
| 100 or less | $1.58 \times 10^{-12}$ or less | $1.05 \times 10^{-12}$ or less |
| 50 or less | $7.91 \times 10^{-13}$ or less | $5.27 \times 10^{-13}$ or less |

TABLE 3

| $N_{tap}$ | To reflect power of 95.44% or more of original signals on MIMO calculation | To reflect power of 99.74% or more of original signals on MIMO calculation |
|---|---|---|
| 500 or less | $2.5 \times 10^{-12}$ or less | $1.67 \times 10^{-12}$ or less |
| 450 or less | $2.25 \times 10^{-12}$ or less | $1.5 \times 10^{-12}$ or less |
| 400 or less | $2.0 \times 10^{-12}$ or less | $1.33 \times 10^{-12}$ or less |
| 350 or less | $1.75 \times 10^{-12}$ or less | $1.17 \times 10^{-12}$ or less |
| 300 or less | $1.5 \times 10^{-12}$ or less | $1.0 \times 10^{-12}$ or less |
| 250 or less | $1.25 \times 10^{-12}$ or less | $8.33 \times 10^{-13}$ or less |
| 200 or less | $1.0 \times 10^{-12}$ or less | $6.67 \times 10^{-13}$ or less |
| 150 or less | $7.5 \times 10^{-13}$ or less | $5.0 \times 10^{-13}$ or less |
| 100 or less | $5.0 \times 10^{-13}$ or less | $3.33 \times 10^{-13}$ or less |
| 50 or less | $2.5 \times 10^{-13}$ or less | $1.67 \times 10^{-13}$ or less |

Table 4 shows the results of calculations of $2n_g\Lambda/(cR)\cdot(\gamma\pi)^{-1/2}$ desired to be satisfied by the fiber, using Expression (26) and Expression (27), for the number of taps to be 500 or less, 450 or less, 400 or less, 350 or less, 300 or less, 250 or less, 200 or less, 150 or less, 100 or less, and 50 or less, on the assumption that the bending radius R of the MCF is 0.1 m in use of the MCF after embedded in a cable and laid and under the condition that $f_{symbol}$ is not less than 25 GBaud ($=2.5\times10^{10}$ Baud:$2.5\times10^{10}$ symbols per second) and the signals are transmitted at least through the distance L=100 km=$1\times10^5$ m. Table 5 shows the results of calculations of $2n_g\Lambda/(cR)\cdot(\gamma\pi)^{-1/2}$ desired to be satisfied by the fiber, using Expression (26) and Expression (27), for the number of taps to be 500 or less, 450 or less, 400 or less, 350 or less, 300 or less, 250 or less, 200 or less, 150 or less, 100 or less, and 50 or less, on the same assumption as above and under the condition that $f_{symbol}$ is not less than 25 GBaud ($=2.5\times10^{10}$ Baud:$2.5\times10^{10}$ symbols per second) and the signals are transmitted at least through the distance L=1000 km=$1\times10^6$ m.

TABLE 4

| $N_{tap}$ | To reflect power of 95.44% or more of original signals on MIMO calculation | To reflect power of 99.74% or more of original signals on MIMO calculation |
|---|---|---|
| 500 or less | $7.91 \times 10^{-13}$ or less | $5.27 \times 10^{-13}$ or less |
| 450 or less | $7.12 \times 10^{-13}$ or less | $4.74 \times 10^{-13}$ or less |
| 400 or less | $6.32 \times 10^{-13}$ or less | $4.22 \times 10^{-13}$ or less |
| 350 or less | $5.53 \times 10^{-13}$ or less | $3.69 \times 10^{-13}$ or less |
| 300 or less | $4.74 \times 10^{-13}$ or less | $3.16 \times 10^{-13}$ or less |
| 250 or less | $3.95 \times 10^{-13}$ or less | $2.64 \times 10^{-13}$ or less |
| 200 or less | $3.16 \times 10^{-13}$ or less | $2.11 \times 10^{-13}$ or less |
| 150 or less | $2.37 \times 10^{-13}$ or less | $1.58 \times 10^{-13}$ or less |
| 100 or less | $1.58 \times 10^{-13}$ or less | $1.05 \times 10^{-13}$ or less |
| 50 or less | $7.91 \times 10^{-14}$ or less | $5.27 \times 10^{-14}$ or less |

TABLE 5

| $N_{tap}$ | To reflect power of 95.44% or more of original signals on MIMO calculation | To reflect power of 99.74% or more of original signals on MIMO calculation |
|---|---|---|
| 500 or less | $2.5 \times 10^{-13}$ or less | $1.67 \times 10^{-13}$ or less |
| 450 or less | $2.25 \times 10^{-13}$ or less | $1.5 \times 10^{-13}$ or less |
| 400 or less | $2.0 \times 10^{-13}$ or less | $1.33 \times 10^{-13}$ or less |
| 350 or less | $1.75 \times 10^{-13}$ or less | $1.17 \times 10^{-13}$ or less |
| 300 or less | $1.5 \times 10^{-13}$ or less | $1.0 \times 10^{-13}$ or less |
| 250 or less | $1.25 \times 10^{-13}$ or less | $8.33 \times 10^{-14}$ or less |
| 200 or less | $1.0 \times 10^{-13}$ or less | $6.67 \times 10^{-14}$ or less |
| 150 or less | $7.5 \times 10^{-14}$ or less | $5.0 \times 10^{-14}$ or less |
| 100 or less | $5.0 \times 10^{-14}$ or less | $3.33 \times 10^{-14}$ or less |
| 50 or less | $2.5 \times 10^{-14}$ or less | $1.67 \times 10^{-14}$ or less |

Table 6 shows the results of calculations of $2n_g\Lambda/(cR) \cdot (\gamma\pi)^{-1/2}$ desired to be satisfied by the fiber, using Expression (26) and Expression 27), for the number of taps to be 500 or less, 450 or less, 400 or less, 350 or less, 300 or less, 250 or less, 200 or less, 150 or less, 100 or less, and 50 or less, on the assumption that the bending radius R of the MCF is 1 m in use of the MCF after embedded in a cable and laid and under the condition that $f_{symbol}$ is not less than 25 GBaud (=$2.5\times10^{10}$ Baud: $2.5\times10^{10}$ symbols per second) and the signals are transmitted at least through the distance L=100 km=$1\times10^5$ m. Table 7 shows the results of calculations of $2n_g\Lambda/(cR) \cdot (\gamma\pi)^{-1/2}$ desired to be satisfied by the fiber, using Expression (26) and Expression (27), for the number of taps to be 500 or less, 450 or less, 400 or less, 350 or less, 300 or less, 250 or less, 200 or less, 150 or less, 100 or less, and 50 or less, on the same assumption as above and under the condition that $f_{symbol}$ is not less than 25 GBaud (=$2.5\times10^{10}$ Baud: $2.5\times10^{10}$ symbols per second) and the signals are transmitted at least through the distance L=1000 km=$1\times10^6$ m.

TABLE 6

| $N_{tap}$ | To reflect power of 95.44% or more of original signals on MIMO calculation | To reflect power of 99.74% or more of original signals on MIMO calculation |
|---|---|---|
| 500 or less | $7.91 \times 10^{-12}$ or less | $5.27 \times 10^{-12}$ or less |
| 450 or less | $7.12 \times 10^{-12}$ or less | $4.74 \times 10^{-12}$ or less |
| 400 or less | $6.32 \times 10^{-12}$ or less | $4.22 \times 10^{-12}$ or less |
| 350 or less | $5.53 \times 10^{-12}$ or less | $3.69 \times 10^{-12}$ or less |
| 300 or less | $4.74 \times 10^{-12}$ or less | $3.16 \times 10^{-12}$ or less |
| 250 or less | $3.95 \times 10^{-12}$ or less | $2.64 \times 10^{-12}$ or less |
| 200 or less | $3.16 \times 10^{-12}$ or less | $2.11 \times 10^{-12}$ or less |
| 150 or less | $2.37 \times 10^{-12}$ or less | $1.58 \times 10^{-12}$ or less |
| 100 or less | $1.58 \times 10^{-12}$ or less | $1.05 \times 10^{-12}$ or less |
| 50 or less | $7.91 \times 10^{-13}$ or less | $5.27 \times 10^{-13}$ or less |

TABLE 7

| $N_{tap}$ | To reflect power of 95.44% or more of original signals on MIMO calculation | To reflect power of 99.74% or more of original signals on MIMO calculation |
|---|---|---|
| 500 or less | $2.5 \times 10^{-12}$ or less | $1.67 \times 10^{-12}$ or less |
| 450 or less | $2.25 \times 10^{-12}$ or less | $1.5 \times 10^{-12}$ or less |
| 400 or less | $2.0 \times 10^{-12}$ or less | $1.33 \times 10^{-12}$ or less |
| 350 or less | $1.75 \times 10^{-12}$ or less | $1.17 \times 10^{-12}$ or less |
| 300 or less | $1.5 \times 10^{-12}$ or less | $1.0 \times 10^{-12}$ or less |
| 250 or less | $1.25 \times 10^{-12}$ or less | $8.33 \times 10^{-13}$ or less |
| 200 or less | $1.0 \times 10^{-12}$ or less | $6.67 \times 10^{-13}$ or less |
| 150 or less | $7.5 \times 10^{-13}$ or less | $5.0 \times 10^{-13}$ or less |
| 100 or less | $5.0 \times 10^{-13}$ or less | $3.33 \times 10^{-13}$ or less |
| 50 or less | $2.5 \times 10^{-13}$ or less | $1.67 \times 10^{-13}$ or less |

Table 8 shows the results of calculations of $2n_g\Lambda/(cR) \cdot (\gamma\pi)^{-1/2}$ desired to be satisfied by the fiber, using Expression (26) and Expression (27), for the number of taps to be 500 or less, 450 or less, 400 or less, 350 or less, 300 or less, 250 or less, 200 or less, 150 or less, 100 or less, and 50 or less, on the assumption that the bending radius R of the MCF is 10 m in use of the MCF after embedded in a cable and laid and under the condition that $f_{symbol}$ is not less than 25 GBaud (=$2.5\times10^{10}$ Baud:$2.5\times10^{10}$ symbols per second) and the signals are transmitted at least through the distance L=100 km=$1\times10^5$ m. Table 9 shows the results of calculations of $2n_g\Lambda/(cR) \cdot (\gamma\pi)^{-1/2}$ desired to be satisfied by the fiber, using Expression (26) and Expression (27), for the number of taps to be 500 or less, 450 or less, 400 or less, 350 or less, 300 or less, 250 or less, 200 or less, 150 or less, 100 or less, and 50 or less, on the same assumption as above and under the condition that $f_{symbol}$ is not less than 25 GBaud (=$2.5\times10^{10}$ Baud:$2.5\times10^{10}$ symbols per second) and the signals are transmitted at least through the distance L=1000 km=$1\times10^6$ m.

TABLE 8

| $N_{tap}$ | To reflect power of 95.44% or more of original signals on MIMO calculation | To reflect power of 99.74% or more of original signals on MIMO calculation |
|---|---|---|
| 500 or less | $7.91 \times 10^{-11}$ or less | $5.27 \times 10^{-11}$ or less |
| 450 or less | $7.12 \times 10^{-11}$ or less | $4.74 \times 10^{-11}$ or less |
| 400 or less | $6.32 \times 10^{-11}$ or less | $4.22 \times 10^{-11}$ or less |
| 350 or less | $5.53 \times 10^{-11}$ or less | $3.69 \times 10^{-11}$ or less |
| 300 or less | $4.74 \times 10^{-11}$ or less | $3.16 \times 10^{-11}$ or less |
| 250 or less | $3.95 \times 10^{-11}$ or less | $2.64 \times 10^{-11}$ or less |
| 200 or less | $3.16 \times 10^{-11}$ or less | $2.11 \times 10^{-11}$ or less |
| 150 or less | $2.37 \times 10^{-11}$ or less | $1.58 \times 10^{-11}$ or less |
| 100 or less | $1.58 \times 10^{-11}$ or less | $1.05 \times 10^{-11}$ or less |
| 50 or less | $7.91 \times 10^{-12}$ or less | $5.27 \times 10^{-12}$ or less |

TABLE 9

| $N_{tap}$ | To reflect power of 95.44% or more of original signals on MIMO calculation | To reflect power of 99.74% or more of original signals on MIMO calculation |
|---|---|---|
| 500 or less | $2.5 \times 10^{-11}$ or less | $1.67 \times 10^{-11}$ or less |
| 450 or less | $2.25 \times 10^{-11}$ or less | $1.5 \times 10^{-11}$ or less |
| 400 or less | $2.0 \times 10^{-11}$ or less | $1.33 \times 10^{-11}$ or less |
| 350 or less | $1.75 \times 10^{-11}$ or less | $1.17 \times 10^{-11}$ or less |
| 300 or less | $1.5 \times 10^{-11}$ or less | $1.0 \times 10^{-11}$ or less |
| 250 or less | $1.25 \times 10^{-11}$ or less | $8.33 \times 10^{-12}$ or less |
| 200 or less | $1.0 \times 10^{-11}$ or less | $6.67 \times 10^{-12}$ or less |
| 150 or less | $7.5 \times 10^{-12}$ or less | $5.0 \times 10^{-12}$ or less |
| 100 or less | $5.0 \times 10^{-12}$ or less | $3.33 \times 10^{-12}$ or less |
| 50 or less | $2.5 \times 10^{-12}$ or less | $1.67 \times 10^{-12}$ or less |

Furthermore, $\sigma_\tau/L^{1/2}$ is more preferably controlled to not more than a value equivalent to PMD in a standard single-mode fiber (SSMF) or at least to not more than ten times the value because an increase of the number of taps can be controlled to not more than ten times. The PMD of SSMF is generally at most 0.5 ps/km$^{1/2}$ (i.e., about 1.58×10$^{-14}$ s/m$^{1/2}$) or less.

In order to keep $\sigma_\tau/L^{1/2}$ not more than ten times 0.5 ps/km$^{1/2}$, i.e., not more than 5.0 ps/km$^{1/2}$ (about 1.58×10$^{-13}$ s/m$^{1/2}$), the multi-core optical fiber of the present invention preferably satisfies Expression (28) below, based on above Expression (21). In order to keep $\sigma_\tau/L^{1/2}$ not more than five times 0.5 ps/km$^{1/2}$, i.e., not more than 2.5 ps/km$^{1/2}$ (about 7.91×10$^{-14}$ s/m$^{1/2}$), the multi-core optical fiber of the present invention preferably satisfies Expression (29) below. Furthermore, in order to keep $\sigma_\tau/L^{1/2}$ not more than twice 0.5 ps/km$^{1/2}$, i.e., not more than 1.0 ps/km$^{1/2}$ (about 3.16×10$^{-14}$ s/m$^{1/2}$), the multi-core optical fiber of the present invention preferably satisfies Expression (30) below. In order to keep $\sigma_\tau/L^{1/2}$ equal to or less than 0.5 ps/km$^{1/2}$ (about 1.58×10$^{-13}$ s/m$^{1/2}$), the multi-core optical fiber of the present invention preferably satisfies Expression (31) below. The units of the respective parameters are L (m), Λ (m), c (m/s), R (m), and γ (rad/m).

$$\frac{2n_g \Lambda}{cR\sqrt{\gamma\pi}} \leq 1.58 \times 10^{-13} \quad (28)$$

$$\frac{2n_g \Lambda}{cR\sqrt{\gamma\pi}} \leq 7.91 \times 10^{-14} \quad (29)$$

$$\frac{2n_g \Lambda}{cR\sqrt{\gamma\pi}} \leq 3.16 \times 10^{-14} \quad (30)$$

$$\frac{2n_g \Lambda}{cR\sqrt{\gamma\pi}} \leq 1.58 \times 10^{-14} \quad (31)$$

Table 10 shows values of $2n_g\Lambda/(cR)\cdot(\gamma\pi)^{-1/2}$ desired to be satisfied by the multi-core optical fiber of the present invention, in order to satisfy Expressions (28) to (31), where the bending radius R of the MCF in use of the MCF after embedded in a cable and laid is assumed to be 10 m or more, 5 m or more, 3 m or more, 2 m or more, 1 m or more, and 0.2 m or more. Table 11 shows desired values of γ (rad/m) for realizing the values in Table 10, on the assumption that $n_g$=1.46 and Λ is not more than 25 μm (=25×10$^{-6}$ m).

For example, in the case of ordinary ribbon slotted-core cables in consideration, the bending radii given to fibers after embedded in the cables are mostly in the range of 0.2 to 2 m. Therefore, it is speculated from Table 10 that if $2n_g\Lambda/(cR)\cdot(\gamma\pi)^{-1/2}$ in the multi-core optical fiber is not more than 3.16×10$^{-14}$, $\sigma_\tau/L^{1/2}$ can be kept not more than 5.0 ps/km$^{1/2}$ when the multi-core optical fiber is embedded in the ordinary ribbon slotted-core cable. Similarly, it is speculated from Table 11 that if Λ is not more than 25 μm (=25×10$^{-6}$ m) and γ is not less than about 4.72 rad/m, $\sigma_\tau/L^{1/2}$ can be kept not more than 5.0 ps/km$^{1/2}$ when the multi-core optical fiber is embedded in the ordinary ribbon slotted-core cable.

TABLE 10

| | $\sigma_\tau/L^{1/2}$ | | | |
|---|---|---|---|---|
| R | 5.0 ps/km$^{1/2}$ or less | 2.5 ps/km$^{1/2}$ or less | 1.0 ps/km$^{1/2}$ or less | 0.5 ps/km$^{1/2}$ or less |
| 10 m or more | 1.58 × 10$^{-12}$ or less | 7.91 × 10$^{-13}$ or less | 3.16 × 10$^{-13}$ or less | 1.58 × 10$^{-13}$ or less |
| 5 m or more | 7.91 × 10$^{-13}$ or less | 3.95 × 10$^{-13}$ or less | 1.58 × 10$^{-13}$ or less | 7.91 × 10$^{-14}$ or less |
| 3 m or more | 4.74 × 10$^{-13}$ or less | 2.37 × 10$^{-13}$ or less | 9.49 × 10$^{-14}$ or less | 4.74 × 10$^{-14}$ or less |
| 2 m or more | 3.16 × 10$^{-13}$ or less | 1.58 × 10$^{-13}$ or less | 6.32 × 10$^{-14}$ or less | 3.16 × 10$^{-14}$ or less |
| 1 m or more | 1.58 × 10$^{-13}$ or less | 7.91 × 10$^{-14}$ or less | 3.16 × 10$^{-14}$ or less | 1.58 × 10$^{-14}$ or less |
| 0.2 m or more | 3.16 × 10$^{-14}$ or less | 1.58 × 10$^{-14}$ or less | 6.32 × 10$^{-15}$ or less | 3.16 × 10$^{-15}$ or less |

TABLE 11

| | $\sigma_\tau/L^{1/2}$ | | | |
|---|---|---|---|---|
| R | 5.0 ps/km$^{1/2}$ or less | 2.5 ps/km$^{1/2}$ or less | 1.0 ps/km$^{1/2}$ or less | 0.5 ps/km$^{1/2}$ or less |
| 10 m or more | 0.002 rad/m or more | 0.008 rad/m or more | 0.05 rad/m or more | 0.19 rad/m or more |
| 5 m or more | 0.008 rad/m or more | 0.03 rad/m or more | 0.19 rad/m or more | 0.75 rad/m or more |
| 3 m or more | 0.02 rad/m or more | 0.08 rad/m or more | 0.52 rad/m or more | 2.10 rad/m or more |
| 2 m or more | 0.05 rad/m or more | 0.19 rad/m or more | 1.18 rad/m or more | 4.72 rad/m or more |
| 1 m or more | 0.19 rad/m or more | 0.75 rad/m or more | 4.72 rad/m or more | 18.9 rad/m or more |
| 0.2 m or more | 4.72 rad/m or more | 18.9 rad/m or more | 118 rad/m or more | 472 rad/m or more |

When R stands for bending radius of the fiber in use and $R_{bobbin}$ for the bending radius of the fiber in a wound state on a bobbin, the fiber preferably satisfies Expression (32) on the basis of Expression (21), for $\sigma_\tau/L^{1/2}$ to satisfy target A in use. At this time, a target to be satisfied in the wound state on the bobbin is $AR/R_{bobbin}$, from Expression (33).

$$\frac{2n_g \Lambda}{cR\sqrt{\gamma\pi}} \leq A \quad (32)$$

$$\frac{2n_g \Lambda}{cR_{bobbin}\sqrt{\gamma\pi}} = \frac{2n_g \Lambda}{cR\sqrt{\gamma\pi}} \frac{R}{R_{bobbin}} \leq A \frac{R}{R_{bobbin}} \quad (33)$$

Next, let us consider a desired relation between $N_{tap}$ and $f_{symbol}$ in transmission using the multi-core optical fiber of the present invention satisfying Expression (28). $N_{tap}$ and $f_{symbol}$ preferably satisfy Expression (22) to reflect the power of 95.44% of the original signals on the MIMO calculation; $N_{tap}$ and $f_{symbol}$ more preferably satisfy Expression (23) to reflect the power of 99.74% of the original signals on the MIMO calculation; however, reflection of the power of a percentage of more than necessary will lead to increase in $N_{tap}$ and, in turn, to increase in computational complexity. It is thus preferable to reflect the power of not less than 95.44% and not more than 99.74% of the original signals on the MEMO calculation; the relation between $N_{tap}$ and $f_{symbol}$ is preferably set so as to satisfy Expression (34) below; Expression (35) below is preferably satisfied from above Expression (21).

$$\frac{N_{tap}}{12 f_{symbol}} \leq \sigma_\tau \leq \frac{N_{tap}}{8 f_{symbol}} \qquad (34)$$

$$\frac{N_{tap}}{12 f_{symbol}} \leq 2 \frac{n_g \Lambda}{cR} \sqrt{\frac{L}{\gamma \pi}} \leq \frac{N_{tap}}{8 f_{symbol}} \qquad (35)$$

By rearranging Expression (34) with respect to $N_{tap}/f_{symbol}$, we obtain Expression (36) below.

$$8\sigma_\tau \leq \frac{N_{tap}}{f_{symbol}} \leq 12\sigma_\tau \qquad (36)$$

Therefore, when transmission is carried out using the multi-core optical fiber with $\sigma_\tau/L^{1/2}$ of not more than 5.0 ps/km$^{1/2}$ (i.e., about $1.58 \times 10^{-13}$ s/m$^{1/2}$), the relation between $N_{tap}$ and $f_{symbol}$ preferably satisfies at least Expression (37) below on the basis of Expression (36). In this relation, the unit of $f_{symbol}$ is Baud and the unit of L is m.

$$8 \times 1.58 \times 10^{-13} \sqrt{L} \leq \frac{N_{tap}}{f_{symbol}} \leq 12 \times 1.58 \times 10^{-13} \sqrt{L} \qquad (37)$$

Figure 4:
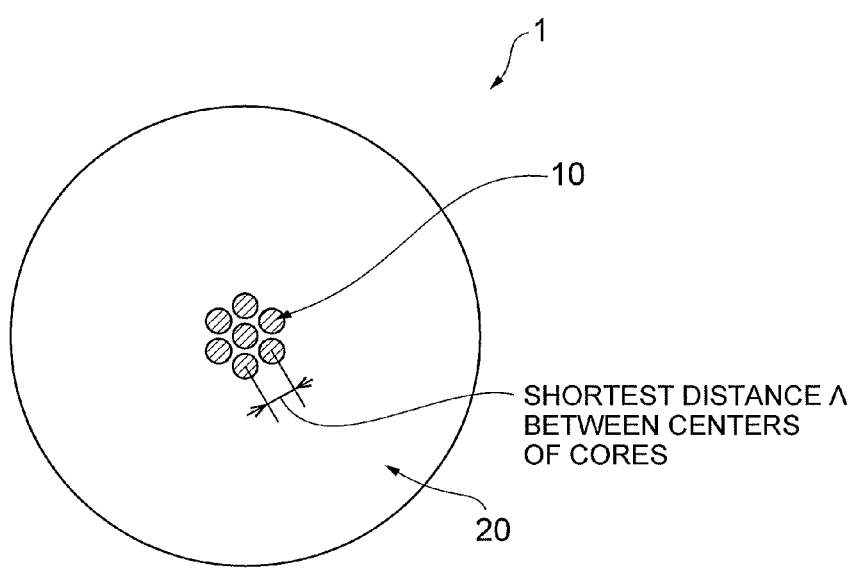
FIG. 4 is a sectional view illustrating a configuration of a multi-core optical fiber according to an embodiment of the present invention.

A multi-core optical fiber according to an embodiment of the present invention preferably has a constellation in which a plurality of cores are arranged in physical proximity and in an optically coupled state to each other. FIG. 4 shows an example of sectional view of such a multi-core optical fiber. In the multi-core optical fiber 1 shown in FIG. 4, a plurality of cores 10 are arranged in proximity and a cladding 20 is disposed around them. The plurality of cores 10 may be in physical contact with each other, but they are preferably separated from each other without contact, so as to facilitate input/output of signals into and from the respective cores 10. Therefore, the peripheries of the respective cores 10 are preferably separated at least about 1 μm or more from each other, more preferably separated at least about 5 μm or more from each other, and still more preferably separated at least about 10 μm or more from each other. The optically coupled state refers to a state in which the inter-core crosstalk is sufficiently large. The crosstalk between adjacent cores is preferably not less than −15 dB, more preferably not less than −10 dB, still more preferably not less than −5 dB, and yet more preferably approximately 0 dB. Since the inter-core DGD increases with increase of core pitch as described above, the values listed as Λ heretofore are preferably at least "the shortest distances between the centers of the respective cores" and more preferably "the longest distances between the centers of the respective cores in physical proximity and in the optically coupled state."

Figure 5:
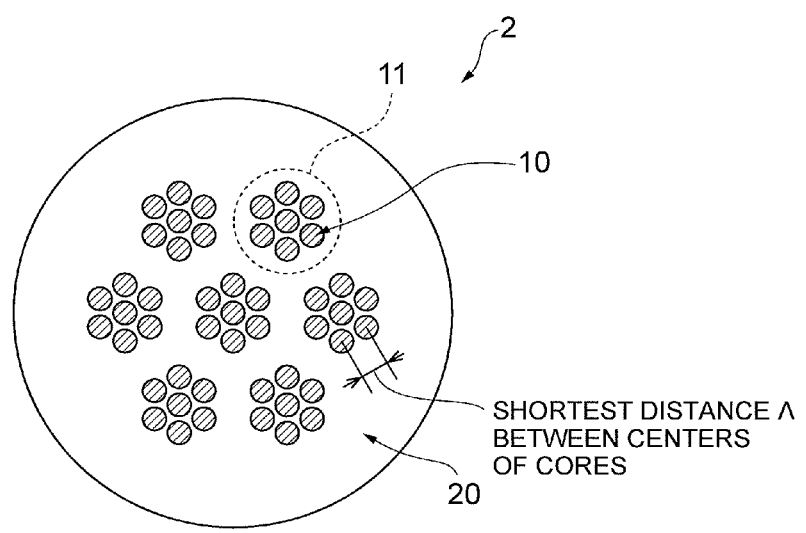
FIG. 5 is a sectional view illustrating another configuration of a multi-core optical fiber according to an embodiment of the present invention.

A preferred multi-core optical fiber according to an embodiment of the present invention is one wherein a plurality of embedded cores constitute a plurality of core groups each of which is composed of some cores, not all the cores, in physical proximity and in the optically coupled state, out of all the cores, and wherein the core groups are arranged in a state in which the crosstalk between them is appropriately suppressed. The crosstalk between adjacent cores in each core group is preferably not less than −15 dB, more preferably not less than −10 dB, still more preferably not less than −5 dB, and yet more preferably approximately 0 dB. The crosstalk between core groups is preferably at least not more than −16.7 dB, more preferably not more than −20 dB, and still more preferably not more than −30 dB. FIG. 5 shows an example of sectional view of such a multi-core optical fiber.

The multi-core optical fiber 2 shown in FIG. 5 has a constellation in which seven core groups 11 each consisting of seven cores 10 are formed and these are covered by a cladding 20. It should be noted that these numbers are not limited to the exemplified values. The example of FIG. 4 can also be referred to as a constellation with one core group (cf. FIG. 1A). Use of such MCF as a transmission line is preferred to reduce the computational complexity of the MIMO calculation in the case where the MIMO technology is applied individually to demulplexing and decoding of spatial multiplexed signals in each individual core group 11 but is not applied to all the cores together.

A multi-core optical fiber transmission system using a multi-core optical fiber according to an embodiment of the present invention as a transmission line can decrease the DGD between spatial modes used in multiplexing, not by multiplexing signals in a plurality of supermodes guided together by the foregoing core groups 11 (i.e., not by coupling signals for spatial multiplexing of a transmitter to respective supermodes guided in the core groups of the MCF at time of coupling from the transmitter to the multi-core optical fiber and by spatially demultiplexing signals before the MIMO process of a receiver from the respective supermodes of the MCF at time of coupling from the multi-core optical fiber to the receiver), but by multiplexing signals in spatial modes guided in the respective cores 10 in the foregoing core groups 11 (i.e., by coupling the signals for spatial multiplexing of the transmitter to spatial modes individually guided in the respective cores of the multi-core optical fiber at time of coupling from the transmitter to the MCF and by spatially demultiplexing the signals before the MIMO process of the receiver from the respective modes of the multi-core optical fiber at time of coupling from the MCF to the receiver).

Each of cores embedded in a multi-core optical fiber according to an embodiment of the present invention preferably operates in a single mode. It is because this configuration can suppress occurrence of inter-mode DGD (i.e., DMD) in the same core. Although it is recited here that "each of the cores in the core group composed of the cores in physical proximity and in the optically coupled state operates in a single mode," such a configuration can be restated as "a core group guides spatial modes of up to the same order as the number of cores in the core group but spatial modes of orders larger than it are cut off." On the other hand, each of cores embedded in an MCF according to an embodiment of the present invention preferably guides a plurality of spatial modes. This is for inducing random coupling between spatial modes at a high frequency in the longitudinal direction in the core guiding a plurality of spatial modes. When a single core or each of uncoupled cores guides a plurality of spatial modes, it is difficult to induce random coupling between spatial modes at a high frequency in the longitudinal direction. Such random coupling can occur at fiber splice points at most every several km. In contrast to it, a multi-core optical fiber according to an embodiment of the present invention is arranged so that each of the embedded cores guides a plurality of spatial modes, whereby random mode coupling between core modes of the same order in different cores or between core modes of different orders can occur at each of phase matching points. For this reason, the multi-core optical fiber according to the present embodiment can achieve a high spatial mode density and a low DGD together. When each of the cores embedded in the multi-core optical fiber according to the above embodiment operates in multiple modes, the DMD is preferably sufficiently small.

Figure 6:
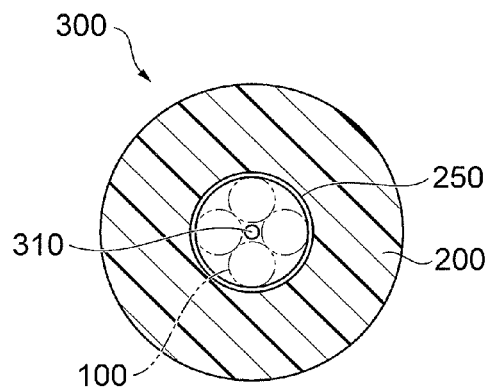
FIGS. 6A and 6B are drawings illustrating an example of a multi-core optical fiber cable according to an embodiment of the present invention.
Figure 6:
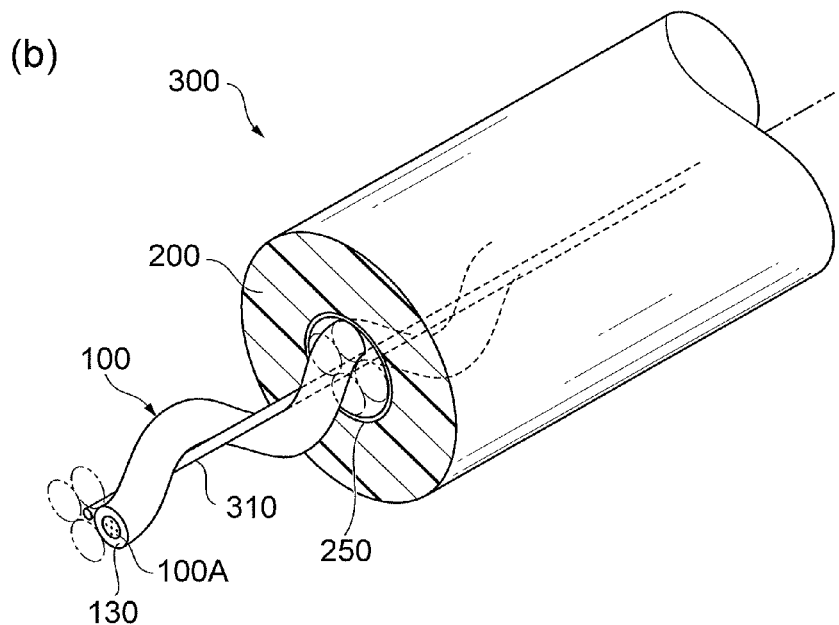
Figure 7:
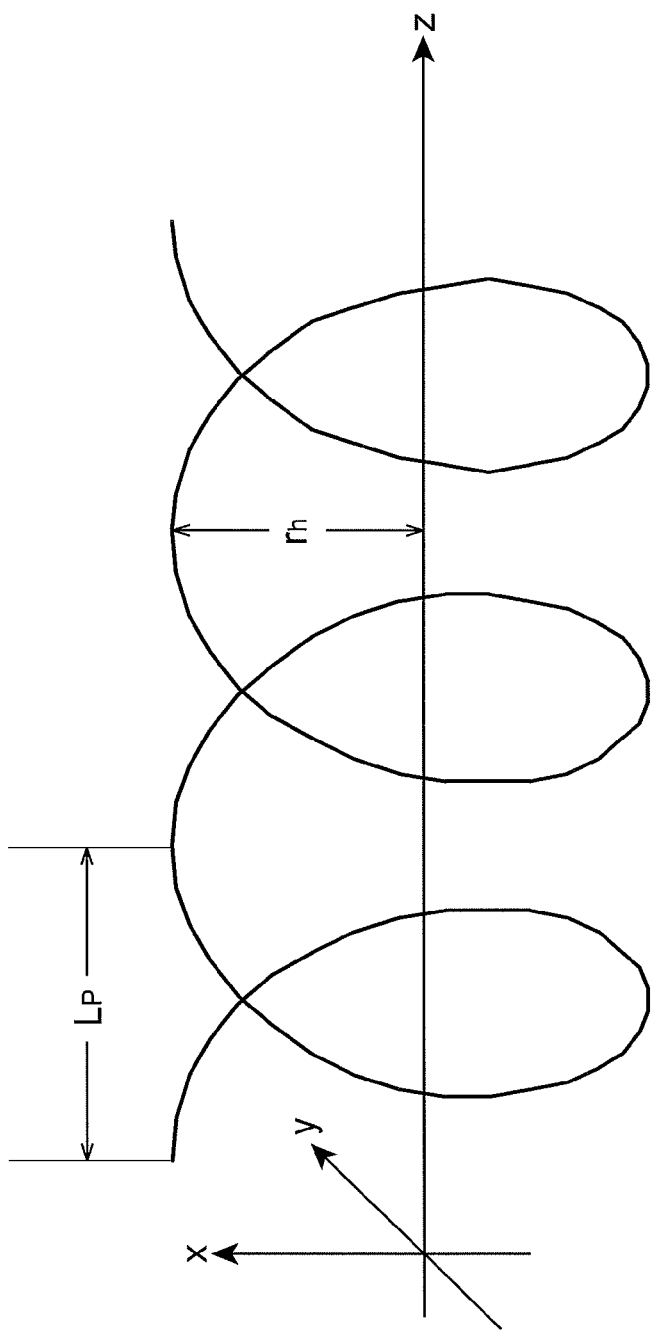
FIG. 7 is a drawing showing a relation between radius $r_h$ and pitch $L_p$ of a helix.

When a multi-core optical fiber according to an embodiment of the present invention is embedded in a cable, the bending radius of the multi-core optical fiber can be controlled by appropriate cabling. FIGS. 6A and 6B show an example of the cabling. An optical fiber cable (multi-core optical fiber cable) 300 shown in FIGS. 6A and 6B has a central member 310, a plurality of optical fibers 100 wound at a predetermined pitch on the central member 310, a hold wrap 250 wound on the optical fibers so as to maintain the wound state thereof, and a jacket 200 covering the periphery of the hold wrap 250. The optical fiber cable 300 is also applicable to the transmission line of the multi-core optical fiber transmission system shown in FIG. 1C. The aforementioned multi-core optical fibers 1, 2 are also applicable to the transmission line of the multi-core optical fiber transmission system shown in FIG. 1C. Each optical fiber 100 consists of a multi-core optical fiber 100A and a resin coating 130 entirely covering the multi-core optical fiber 100A. Each of the optical fibers 100 is wound at the predetermined pitch along the longitudinal direction thereof on the central member 310 so that it is bent in a constant radius of curvature. The jacket 200 covers the whole of the hold wrap 250 so as to protect the optical fibers 100 from external force. Although FIG. 6B shows only one fiber of the optical fibers 100 for simplicity of illustration, all the optical fibers 100 in the optical fiber cable 300 are wound on the central member 310 in fact. When an MCF is embedded in a cable as wound in a helical shape around a predetermined axis of a tension member or the like as in the optical fiber cable shown in FIGS. 6A and 6B, the bending radius R of the MCF can be controlled by adjusting the radius $r_h$ and pitch $L_p$ of the helix. FIG. 7 shows a relation between the radius $r_h$ and pitch $L_p$ of the helix. When a z-axis is set along the longitudinal direction of the predetermined axis and polar coordinates (r, θ) are defined with respect to the z-axis on an xy plane perpendicular to the z-axis, the MCF shows the arrangement of $r=r_h$ and $θ=2πz/L_p$.

As described above, the multi-core optical fibers, multi-core optical fiber cables, and multi-core optical fiber transmission systems according to the embodiments of the present invention enable the calculation effectively using the MIMO technology. It should be noted that the present invention can be modified in various ways without having to be limited to the above embodiments.

The present invention provides the multi-core optical fibers, multi-core optical fiber cables, and multi-core optical fiber transmission systems enabling the calculation effectively using the MIMO technology.

What is claimed is:

1. A multi-core optical fiber comprising: a plurality of cores each extending along a predetermined axis and arranged on a cross section perpendicular to the predetermined axis; and a cladding region integrally surrounding each of the cores, wherein the plurality of cores rotate around the predetermined axis, and wherein when an average twist rate defined as an average value of absolute values of angles of rotations of the cores per unit length along a longitudinal direction of the multi-core optical fiber is γ (rad/m), the shortest distance between centers of the respective cores is Λ (m), a group index for a fundamental mode in each of the cores is $n_g$, an in-use bending radius defined as a bending radius in use of the multi-core optical fiber is R (m), the speed of light in vacuum is c (m/s), and the ratio of the circumference of a circle to its diameter is π, the multi-core optical fiber satisfies at least one of first to third conditions and satisfies at least either of fourth and fifth conditions, the first condition being defined so that Expression (1) below is not more than $7.91 \times 10^{-12}$ ($s/m^{1/2}$), the second condition being defined so that in a state in which the multi-core optical fiber is wound on a bobbin with a radius $R_{bobbin}$ (m), Expression (2) below is not more than $7.91 \times 10^{-12} \times 1/R_{bobbin}$ ($s/m^{1/2}$), the third condition being defined so that the shortest distance Λ is not more than approximately $25 \times 10^{-6}$ m and the average twist rate γ is not less than approximately 4.72 rad/m, the fourth condition being defined so that the shortest distance Λ is not more than approximately $25 \times 10^{-6}$ m, and the fifth condition being defined so that a crosstalk between closest adjacent cores is not less than −15 dB $$\frac{2n_g \Lambda}{cR\sqrt{\gamma\pi}} \tag{1}$$

$$\frac{2n_g \Lambda}{cR_{bobbin}\sqrt{\gamma\pi}}. \tag{2}$$

2. The multi-core optical fiber according to claim 1, wherein in the state in which the multi-core optical fiber is wound on the bobbin with the radius $R_{bobbin}$ (m), said Expression (2) is not more than $7.91 \times 10^{-12} \times 0.2/R_{bobbin}$ ($s/m^{1/2}$).

3. The multi-core optical fiber according to claim 1, wherein the first condition is defined so that said Expression (1) is not more than $1.58 \times 10^{-13}$ ($s/m^{1/2}$), and wherein the second condition is defined so that in the state in which the multi-core optical fiber is wound on the bobbin with the radius $R_{bobbin}$ (m), said Expression (2) is not more than $1.58 \times 10^{-13} \times 1/R_{bobbin}$ ($s/m^{1/2}$), the multi-core optical fiber satisfying at least either of the first and second conditions.

4. The multi-core optical fiber according to claim 3, wherein in the state in which the multi-core optical fiber is wound on the bobbin with the radius $R_{bobbin}$ (m), said Expression (2) is not more than $1.58 \times 10^{-13} \times 0.2/R_{bobbin}$ ($s/m^{1/2}$).

5. The multi-core optical fiber according to claim 1, wherein the in-use bending radius R is not less than 1 m.

6. The multi-core optical fiber according to claim 1, wherein the in-use bending radius R is not less than 0.2 m.

7. The multi-core optical fiber according to claim 1, comprising:

at least one core group composed of a plurality of cores arranged at equal intervals on the circumference of an identical circle in the cross section out of the plurality of cores, wherein the cores belonging to the core group each have the same structure, wherein a crosstalk between adjacent cores out of the cores belonging to the core group is not less than −15 dB, and wherein when the plurality of cores constitute a plurality of core groups, the core groups are adequately separated from each other so that a crosstalk between the core groups is not more than −15 dB.

8. The multi-core optical fiber according to claim 7, wherein when the plurality of cores constitute the plurality of core groups, the cores belonging to all the core groups are arranged on the circumference of any one of a plurality of concentric circles.

9. A multi-core optical fiber cable having an embedded multi-core optical fiber comprising: a plurality of cores each extending along a predetermined axis and arranged on a cross section perpendicular to the predetermined axis; and a cladding region integrally surrounding each of the cores, wherein the plurality of cores rotate around the predetermined axis, and wherein when an average twist rate defined as an average value of absolute values of angles of rotations of the cores per unit length along a longitudinal direction of the multi-core optical fiber is $\gamma$ (rad/m), the shortest distance between centers of the respective cores is $\Lambda$ (m), a group index for a fundamental mode in each of the cores is $n_g$, an in-use bending radius defined as a bending radius in use of the multi-core optical fiber is R (m), the speed of light in vacuum is c (m/s), and the ratio of the circumference of a circle to its diameter is $\pi$, the multi-core optical fiber is embedded while maintaining a state in which Expression (3) below is not more than $7.91 \times 10^{-12}$ (s/m$^{1/2}$)

$$\frac{2n_g \Lambda}{cR\sqrt{\gamma\pi}}. \tag{3}$$

10. The multi-core optical fiber cable according to claim 9, wherein the multi-core optical fiber is embedded while maintaining a state in which said Expression (3) is not more than $1.58 \times 10^{-13}$ (s/m$^{1/2}$).

11. The multi-core optical fiber cable according to claim 9, wherein the multi-core optical fiber is embedded so that an average of bending radii along the longitudinal direction thereof is not less than 0.2 m.

12. The multi-core optical fiber cable according to claim 9, wherein the shortest distance $\Lambda$ is not more than $25 \times 10^{-6}$ m.

13. The multi-core optical fiber cable according to claim 9, wherein a crosstalk between closest adjacent cores out of the plurality of cores is not less than $-15$ dB.

14. A multi-core optical fiber transmission system using as a transmission line a multi-core optical fiber comprising: a plurality of cores each extending along a predetermined axis and arranged on a cross section perpendicular to the predetermined axis; and a cladding region integrally surrounding each of the cores, wherein when an average twist rate defined as an average value of absolute values of angles of rotations of the cores per unit length along a longitudinal direction of the multi-core optical fiber is $\gamma$ (rad/m), the shortest distance between centers of the respective cores is $\Lambda$ (m), a group index for a fundamental mode in each of the cores is $n_g$, a longitudinal average defined as an average of bending radii along the longitudinal direction, of the multi-core optical fiber is R (m), the speed of light in vacuum is c (m/s), the ratio of the circumference of a circle to its diameter is $\pi$, and a symbol rate of signal modulation is $f_{symbol}$ (Baud), the number of taps $N_{tap}$ in execution of a spatially demultiplexing calculation by the MIMO technology is set to satisfy a relation defined by Expression (4) below $$\frac{N_{tap}}{12 f_{symbol}} \leq 2\frac{n_g \Lambda}{cR}\sqrt{\frac{L}{\gamma\pi}} \leq \frac{N_{tap}}{8 f_{symbol}}. \tag{4}$$

15. The multi-core optical fiber transmission system according to claim 14, wherein the shortest distance $\Lambda$ is not more than $25 \times 10^{-6}$ m.

16. A multi-core optical fiber transmission system using as a transmission line the multi-core optical fiber as set forth in claim 1, wherein when a fiber link length between a transmitter and a receiver is L (m), and when a symbol rate of signal modulation is $f_{symbol}$ (Baud), the number of taps $N_{tap}$ in execution of a spatially demultiplexing calculation by the MIMO technology is set to satisfy a relation defined by Expression (5) below $$8 \times 1.58 \times 10^{-13}\sqrt{L} \leq \frac{N_{tap}}{f_{symbol}} \leq 12 \times 1.58 \times 10^{-13}\sqrt{L}. \tag{5}$$

17. A multi-core optical fiber transmission system using as a transmission line the multi-core optical fiber cable as set forth in claim 9, wherein when a fiber link length between a transmitter and a receiver is L (m), and when a symbol rate of signal modulation is $f_{symbol}$ (Baud), the number of taps $N_{tap}$ in execution of a spatially demultiplexing calculation by the MIMO technology is set to satisfy a relation defined by Expression (6) below $$8 \times 1.58 \times 10^{-13}\sqrt{L} \leq \frac{N_{tap}}{f_{symbol}} \leq 12 \times 1.58 \times 10^{-13}\sqrt{L}. \tag{6}$$

18. The multi-core optical fiber transmission system according to claim 14, wherein a crosstalk between closest adjacent cores out of the plurality of cores is not less than $-15$ dB.

* * * * *